March 16, 1954     O. J. BRATZ     2,672,057
BRAKE OPERATING DEVICE
Filed March 3, 1950     2 Sheets-Sheet 1
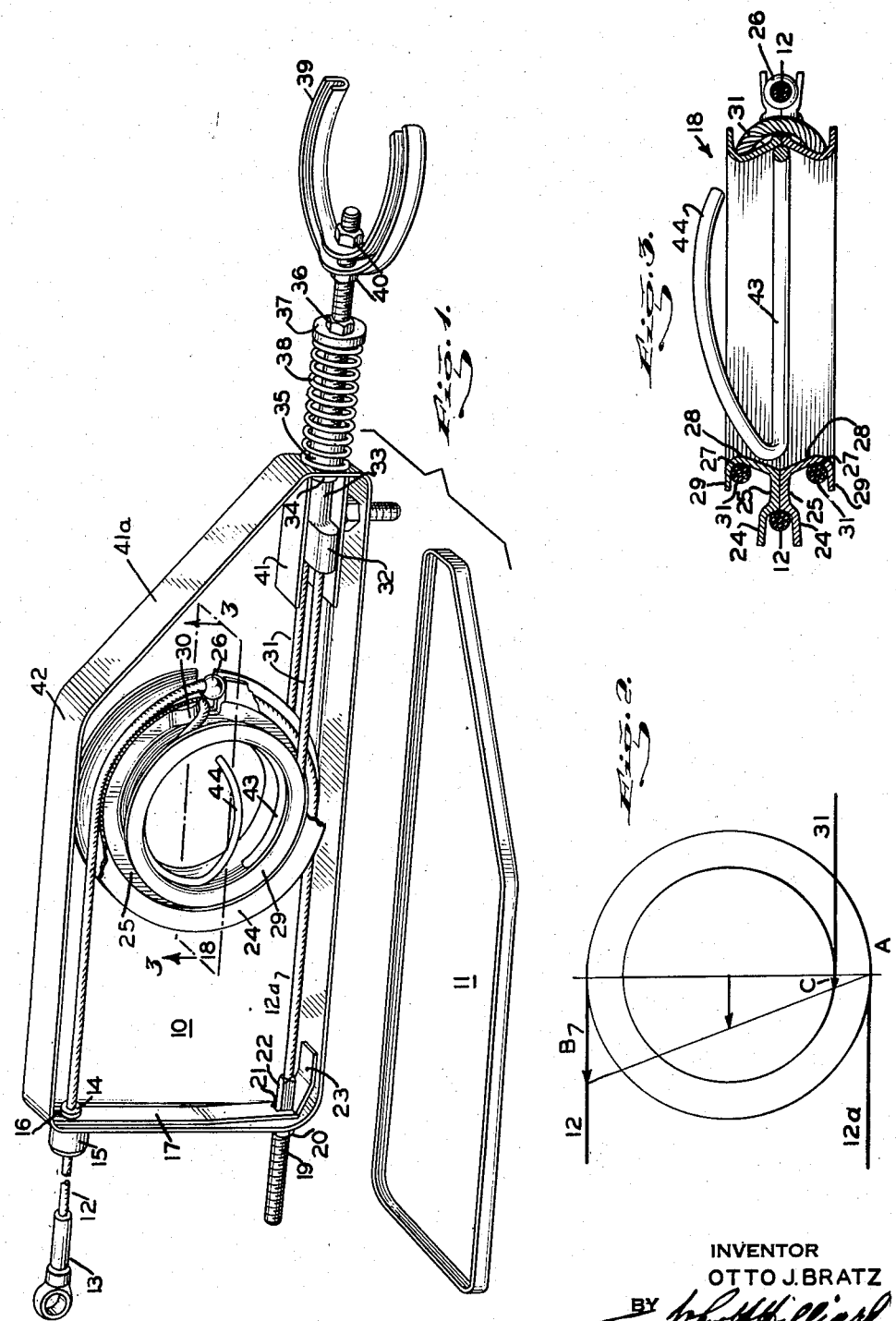
INVENTOR
OTTO J. BRATZ
BY
ATTORNEY

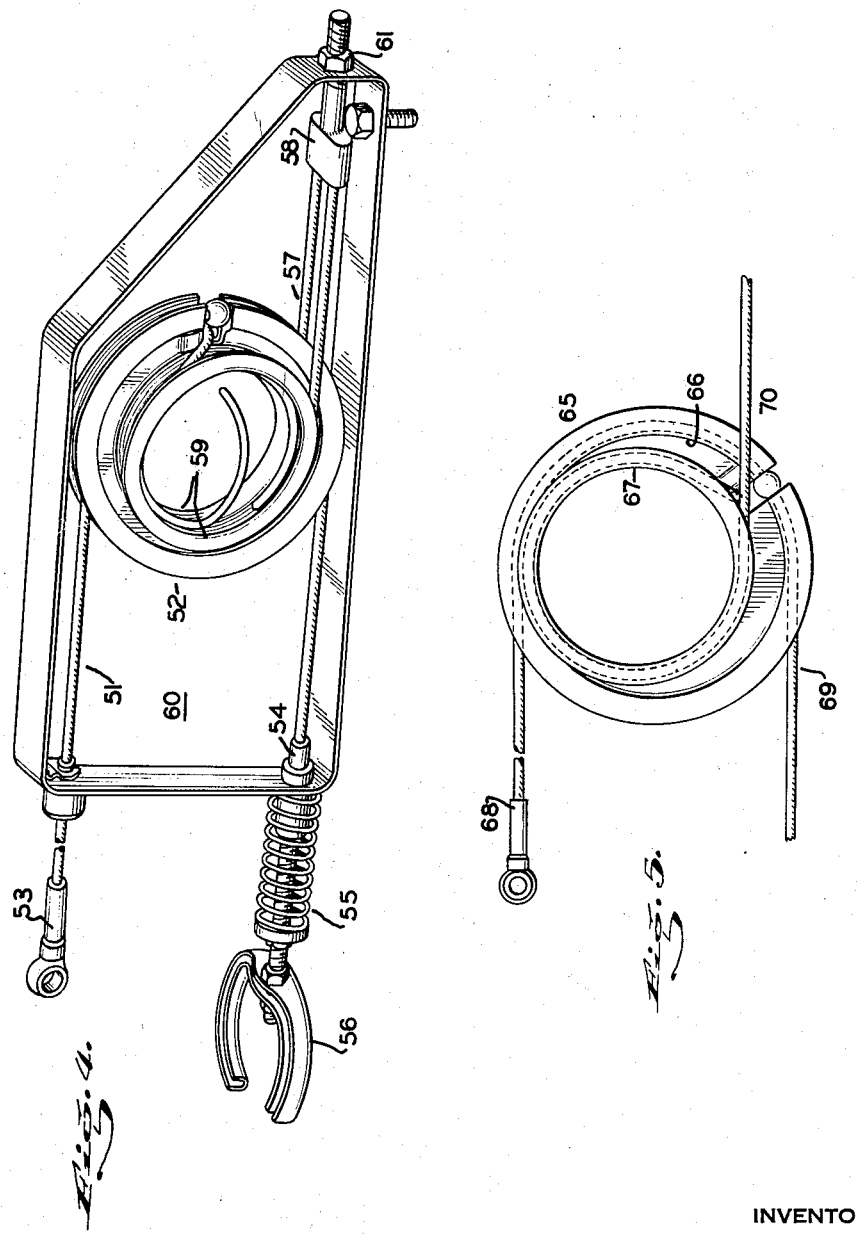

Patented Mar. 16, 1954

2,672,057

UNITED STATES PATENT OFFICE 2,672,057

BRAKE OPERATING DEVICE

Otto J. Bratz, Adrian, Mich., assignor to American Chain & Cable Company, Inc., Bridgeport, Conn., a corporation of New York Application March 3, 1950, Serial No. 147,531

1 Claim. (Cl. 74—110)

This invention relates to so-called power multipliers, and has particular reference to such mechanisms in conjunction with automotive vehicular brakes.

The hand operated brakes of automotive vehicles have been operated by means of Bowden wires for the transmission of the force and motion between the driving compartment and the linkage below the floor of the vehicle. The total leverage between the driver's hand on the brake handle and the cables or rods connected to the wheel brakes is required to be about eight to one. Because of space limitations, it is difficult, if not impossible, to have all this leverage below the floor, when utilizing conventional linkages and, therefore, the leverage below the floor is limited to about three to one. The remaining mechanical advantage is realized by the installation of a linkage in the driving compartment, between the actuating handle of the brake and the transmission cable of the Bowden wire.

Use of any leverage between the handle of the brake and the Bowden wire of necessity requires that the Bowden wire transmit greater forces than would otherwise be the case. Bowden wires, when curved, display greatly increased friction and decreased efficiency as the force transmitted increases.

It is an object of the present invention to provide a power multiplier for a vehicle brake with sufficient mechanical advantage to permit operation by direct application of the force on the brake handle, said multiplier being particularly adapted to operate with cable or strand.

Referring now to the drawings which in connection with the description thereof show preferred embodiments of the invention:

Fig. 1 is a perspective view of one form of the device with the housing cover removed to expose the interior;

Fig. 2 is a diagrammatic showing of the principle of operation of the device of Fig. 1;

Fig. 3 is a section taken at plane 3—3 of Fig. 1;

Fig. 4 is a view similar to Fig. 1 of a modified form of the present invention; and Fig. 5 is an elevation of part of the mechanism of a still further modification of the form of the invention shown in Fig. 1.

Referring first to the form of device shown in Figs. 1 to 3 the device includes a housing 10, forming a covering to protect the parts from dirt and moisture, and serving to hold the parts in assembled relation. A lid or cover 11 closes the open side of this housing.

Power input to the device is through the cable 12, which has a suitable fitting at the end thereof, such as, for example, is indicated by the numeral 13, for attachment to the Bowden wire or lever extending to the driving compartment of the vehicle. For the reasons stated above, the Bowden wire is intended to be without leverage devices in the driving compartment to keep the tension on the Bowden wire at a minimum.

The cable 12 is shown as extending through a fitting 14, which is in the form of a shouldered bushing, with a cap 15 secured to its outer end, the cap being of yieldable material to lightly grip the cable and serve to prevent entry of dirt or water through the fitting 14. On the inner end the fitting 14 is provided with a groove which receives a notch 16 in a spring plate 17. The plate thus holds the fitting in place.

The cable passes around a sheave 18 and the lower portion 12a is secured to the casing 10 by means of a fitting 19 swaged on the end of the cable. This fitting is threaded on its outer end for the reception of a nut 20, to hold it in place. In use, the threaded portion of the fitting is secured to a frame element of the vehicle, as the portion of the cable 12a to which it is attached serves as the reaction cable of the mechanism. The spring element 17 has a notch 21, which fits over a squared portion 22 of the fitting and prevents the fitting from turning. At the same time, the fitting retains the spring member in place, aided by a retaining strip 23 secured to the casing 10 by spot welding or any other means desired.

The sheave 18 has been shown as fabricated of sheet metal by spinning or stamping, in two halves, which may be spot welded or otherwise secured together. As can be seen, each half has an offset flange 24 on the web 25, forming together a tread upon which the cable lies. Incidentally, the flanges 24 are of such diameter as to nearly fill the casing 10 so that there is insufficient space for the cable 12 to leave the groove between the flanges without taking the sheaves out of the casing.

The webs 25 and the flanges 24 of the sheave halves are slotted at one point, to admit a ball fitting 26 swaged or otherwise secured to the cable. The slot and ball cooperate to prevent any slippage between the cable about the tread of the sheave 18. It is to be understood that the ball 26 on the continuous cable could readily be replaced by two balls, on the ends of two separate cables corresponding to the parts 12 and 12a of the continuous cable, which might be desirable in view of the fact that for the shown structure, the cable 12 between the fitting 13 and the ball 26 carries only a fractional part of the load carried by the portion 12a between fitting 19 and the ball 26. Also, for simplicity, the tread upon which cable 12 lies is shown as continuous, but if cable 12 were in two parts as suggested, the tread upon which one part lies can well be of a different radius from the tread upon which the other part lies.

A further tread 27 is formed on each sheave half by the conical portion 28 and flange 29, for the reception of the power output cables. As shown the power output cable treads are smaller in diameter than the tread upon which the cable 12 lies.

For the purpose of symmetry, to prevent introduction of forces tending to cock the sheave around, the power output is taken from both sides of the sheave on the treads 27 mentioned. To equalize the tension on each cable part of the power output, the cable is shown as continuous, passing from one side of the sheave to the other through the slot in the web and is slidable therein. A struck-out portion 30 on each of the webs 25 forms a rounded surface around which a cable 31 can pass without injury. This cable has its ends secured to a wide fitting 32, at points spaced to maintain the parts parallel. A cylindrical portion 33 of the fitting passes through a bushing 34 secured to the wall of the casing, this bushing being provided on its exterior end with a soft rubber cap 35 to serve to prevent entry of dirt or moisture. The cylindrical portion 33 of the fitting is threaded for the reception of nut 36, which holds a spring retainer washer 37 against movement to the right. A spring 38 surrounding the bushing and fitting, is held under compression between the exterior of the wall of the casing 10 and the washer 37 and urges the parts in brake releasing direction, thus assuring that all cables are under tension at all times. A brake cable equalizer yoke 39 is secured to the fitting 32 by means of nuts 40. For the purpose of preventing rotation of the fitting 32, a channel member 41 is provided on the interior of the casing 10, permitting free longitudinal movement of the fitting but limiting its rotational movement.

It will be noted that the casing is tapered at one end as shown at 41a. The corner 42 so formed is arranged so that when the brakes are released the sheave rests therein and is thus held against rattling. To further diminish rattling, a spring member 43 is inserted in the bore of the sheave, and has a portion 44 projecting beyond the plane of the side of the sheave to engage the cover 11 and prevent axial movement of the sheave.

The three cables, it will be noted, are disposed with cables 12 and 31 wound counterclockwise on their treads, while cable 12a is wound on its tread in a clockwise direction, as the device is shown in Fig. 1. This arrangement is shown in Fig. 2. (The understanding is, of course, that the direction of winding does not matter, except that 12 and 31 must be the same, and 12a opposite to them.) Referring now to Fig. 2, a diagrammatic showing is made of the mechanism for the purpose of illustrating its action. As the cable 12a is fixedly anchored at one end by the fitting 19 and the nut 20, the sheave rolls along the cable 12a when tractive motion is given to the upper part of the cable 12. The velocity of the top of the sheave imparted by the pull on the input cable is represented by arrow B and, as the sheave rotates in a counterclockwise direction about A as an instantaneous center when rolling along the cable 12a, the velocity imparted to the cable 31 is represented by the arrow C. As, neglecting friction, the forces are inversely proportional to the velocities in mechanisms of this type, it can be seen that the force multiplication in the described mechanism is directly dependent upon the difference in diameter of the two treads, rather than upon the ratio of their diameters. For this reason, the physical size of the mechanism is not dictated by the multiplication desired, but only by the travel of the output cable needed and such considerations as the minimum safe radius for the cable sheaves.

In Fig. 4 there is shown a modification of the device illustrated in Figs. 1 to 3. Structurally, the device of Fig. 4 is practically identical with the device of Fig. 1 but is modified to permit the power output cable to extend from the same end of the housing as the power input cable. In this form, the cable 51 passing around the sheave 52 has one end secured to a fitting 53 to be connected to the Bowden wire, and the other end connected to a fitting 54 carrying spring 55 and yoke 56, this end being intended to be the power output of the device. A continuous cable 57, having each end secured to a wide fitting 58, and passing around the smaller radius treads 59 of the sheave 52, serves as the reaction member of the device, the fitting 58 being secured to the housing 60 by means of a pair of nuts, one of which, indicated by the numeral 61, is visible in the figure.

In operation, tractive motion of the fitting 53 causes the sheave 52 to rotate about the points of tangency of the cable 57 on the small treads 59, which results in a reduced motion of the power output portion of the cable 51 to the right in Fig. 4.

In Fig. 5 there is shown a fragmentary portion of a still further modification of the devices shown in Figs. 1 to 4. It is often desirable to provide a varying multiplication ratio in a brake system. For instance, the effort needed to bring the brake shoes into contact with the drum is comparatively low, and the multiplication ratio during that part of the operation can be lower than the ratio during application of braking pressure. In Fig. 5 the sheave 65 has the larger tread 66 eccentric with respect to the smaller tread 67. Accordingly, as the tractive movement of the fitting 68 proceeds, the force multiplication of the device increases as the distance between the points of tangency of the lower cables 69 and 70 decreases. Although this variation of force multiplication is attained in the present device by utilizing eccentric circular treads, it is of course to be understood that the same effect can be attained with non-circular treads as well.

It is to be further understood that the above described structures are intended to be only illustrative of the invention, and that considerable modification of the shown structure is possible without departing from the spirit of the invention as expressed in the following claim. The expression "cable" used in the description and claim is intended to convey the idea of a flexible element capable of transmitting a force by tension, and to include wire or even flat bands, as well as various stranded structures.

I claim:

A brake operating mechanism comprising a sheave having a circular tread and a circular flange on each side of said tread, a housing having parallel walk closely engaging the peripheries of the flanges, thus constraining said sheave to rotational movement about its axis and rectilinear movement at right angles to said axis, a tapered portion at one end of said housing for engaging said flanges at one end of the path of rectilinear motion of said sheave, said sheave having further a pair of circular treads concentric to the first-mentioned circular tread of mutually equal radii less than the radius of the first mentioned tread, one of said pair of treads lying on each side of the larger radius tread, a cable passing in a return bend around the larger radius tread and anchored thereto, one end thereof being anchored to the housing, the portion of said cable between an anchorage thus being a reaction cable, the other end of the cable being free to constitute the remaining portion of the cable a power input cable, a pair of power output cables comprising parallel cable wound on the smaller radius treads in the same clock direction as the power input cable is wound, and leaving their treads at points adjacent the points departure of the reaction cable from its tread.

OTTO J. BRATZ.

References Cited in the file of this patent

UNITED STATES PATENTS

| Number | Name | Date |
|---|---|---|
| 1,071,466 | Royle | Aug. 26, 1913 |
| 2,027,275 | Foster | Jan. 7, 1936 |
| 2,080,131 | Harper | May 11, 1937 |
| 2,081,737 | Chittick | May 25, 1937 |